(12) United States Patent
Fan (10) Patent No.: US 7,345,792 B2
(45) Date of Patent: Mar. 18, 2008

(54) SEGMENTATION-BASED HALFTONING (75) Inventor: Zhigang Fan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 972 days.

(21) Appl. No.: 10/321,968

(22) Filed: Dec. 17, 2002

(65) Prior Publication Data

US 2004/0114186 A1    Jun. 17, 2004

(51) Int. Cl.
*H04N 1/405*    (2006.01)
(52) U.S. Cl. .................... 358/3.15; 358/3.06
(58) Field of Classification Search ............. 358/1.9, 358/2.1, 3.14–3.15, 3.21–3.22, 3.06, 3.24, 358/462; 382/162, 164
See application file for complete search history.

(56) References Cited

U.S. PATENT DOCUMENTS

| | | | |
|---|---|---|---|
| 5,327,262 A | 7/1994 | Williams | 358/462 |
| 5,579,446 A * | 11/1996 | Naik et al. | 358/1.9 |
| 5,765,029 A | 6/1998 | Schweid et al. | 395/61 |
| 5,778,156 A | 7/1998 | Schweid et al. | 395/61 |
| 5,850,474 A | 12/1998 | Fan et al. | 382/173 |
| 5,852,678 A | 12/1998 | Shiau et al. | 382/176 |
| 5,949,964 A * | 9/1999 | Clouthier et al. | 358/3.06 |
| 5,966,468 A * | 10/1999 | Fujimoto | 382/239 |
| 6,204,934 B1 * | 3/2001 | Minamino | 358/1.9 |
| 6,240,205 B1 | 5/2001 | Fan et al. | 382/173 |
| 6,266,449 B1 * | 7/2001 | Ohsawa | 382/239 |
| 6,600,832 B1 * | 7/2003 | Nakayama et al. | 382/162 |
| 6,868,180 B2 * | 3/2005 | Akahori et al. | 382/167 |
| 2001/0051065 A1 * | 12/2001 | Togami | 400/76 |

* cited by examiner

*Primary Examiner*—Thomas D. Lee
*Assistant Examiner*—Stephen Brinich (57) ABSTRACT

A method for selecting a halftoning mode to be applied to regions within an image. The method operates on received image data to identify low-level regions within the received image data. The low-level regions are defined and separated by edges. Pixels that are not separated by edges are considered to belong to the same region. After the regions have been identified, low-level image attributes for the image data within each region are compiled. A halftoning method suited for the image data within the region can be selected based upon low-level image attributes.

9 Claims, 7 Drawing Sheets

SEGMENTATION-BASED HALFTONING

FIELD OF THE INVENTION

The present invention relates generally to a system and method for processing image data. More particularly, the teachings herein are directed to the selection of halftoning methods based on low-level image processing properties.

BACKGROUND AND SUMMARY

A common goal in the development of image output systems is improving image quality. It is known that an image processing system may be designed so as to offset the limitations of the rendering system; however, this tailoring can be difficult due to the divergent processing requirements for different image types. Further complicating the design of a system is the reality that a document may be comprised of multiple image types (image classes), including continuous tones (contones), halftones of various frequencies, text/line art, error diffused images, etc. Additionally, when processing image data generated at or targeted for a different system, the characteristics of the image data are typically not known.

To address this situation, various methods have been proposed for segmentation-based halftoning. Segmentation is a well known operation that may use any of a number of classification functions (e.g., auto-correlation, frequency analysis, pattern or template matching, peak/valley detection, histograms, etc.) to analyze video image data and classify image pixels as one of several possible image classes. A typical segmentation process generates a pixel classification signal, sometimes referred to as a segmentation tag, that identifies the pixel as a particular image type or class corresponding to high-level attributes. Some common image types (high-level attributes) include smooth contone, rough contone, text, text on tint, low frequency halftone, high frequency halftone, various intermediate frequency halftones which may be implemented as fuzzy frequencies, background and edge.

Generally, with these methods, the images are first segmented into windows, and within each window, an image processing method that is optimal to the image data within the window is applied. These windows, sometimes are also referred to as objects, are typically classified using high-level attributes semantics (e.g., smooth contone, rough contone, text, text on tint, low frequency halftone, high frequency halftone).

More particularly, such methods separate a page of image data into windows and classify and process the image data within the windows by making either one or two passes through the page of image data. The one pass method is quicker, but it does not allow the use of "future" context to correct information that has already been generated. In a two pass method, during the first pass, the image is separated into windows, and a judgment is made about the type of image data in each window. With a two pass method, during the first pass through the image data, information obtained from processing a given scanline can be used to generate or correct information for previously processed scanlines. In other words, future context can be used. At the end of the first pass, the image type for each pixel is recorded in memory. During the second pass, the information from the first pass, i.e., the image type data, is used to process the image data. An example of a two pass segmentation technique can be found in U.S. Pat. No. 5,850,474 to Fan et al., the disclosure of which is hereby incorporated by reference in its entirety. Additional details on segmentation and image classification can be found in numerous references including, for example, the following U.S. Patents: U.S. Pat. No. 5,327,262 to Williams; U.S. Pat. No. 5,765,029 to Schweid et al.; U.S. Pat. No. 5,778,156 to Schweid et al. and U.S. Pat. No. 5,852,678 to Shiau et al.

While segmentation techniques such as those generally described above provide means for accurately identifying regions within a document and assigning an image type to the regions, the use of such high-level attributes do not necessarily correlate very well with an optimal or favorable halftoning method. In addition, such high level segmentation operations can call for extensive processing and/or resource requirements. Furthermore, there is always desired a method or system which provides an improvement on existing systems or methods. Such improvement may come in the form of improved performance, efficiency, and/or cost, and may include, but is not limited to one or more of reduced hardware or software complexity, reduced system resource requirements (e.g., processing and/or memory), increased speed, increased accuracy, etc.

In accordance with one or more aspects of the teachings herein there is provided a method for reproducing document images wherein an image is segmented into low-level regions that are separated with each other by edges. A region need not necessarily be associated with any high level attributes or meanings. A favorable halftoning method is then selected for the region according to its low-level image processing properties, such as the dimensions, the brightness (color) distribution, and the smoothness of the region.

In accordance with one or more aspects of the teachings herein there is provided a method for selecting a halftoning mode to be applied to an image, comprising: receiving image data; identifying a region in the image data; determining low-level image attributes for the region; and selecting a halftone mode to be applied to the region based on the low-level image attributes of the region.

In accordance with one or more aspects of the teachings herein there is provided a method for selecting a method for selecting a halftoning for use within an image. The method includes receiving image data; segmenting the received image data to identify a low-level region within the image; determining low-level image attributes for the region; and selecting a halftone mode to be applied to the region based on the low-level image attributes determined for the region.

BRIEF DESCRIPTION OF THE DRAWINGS

The teachings and embodiments disclosed herein will be described with reference to the accompanying drawings, which are provided for purposes of illustrating various aspects of the teachings and embodiments and are not to be construed as limiting the same, wherein.

DESCRIPTION

The present description is directed in particular to elements forming part of, or cooperating more directly with an apparatus for or method of processing image data in accordance with teachings and embodiments disclosed herein. It is to be understood that elements not specifically shown or described may take various forms well known to those skilled in the art.

Figure 1:
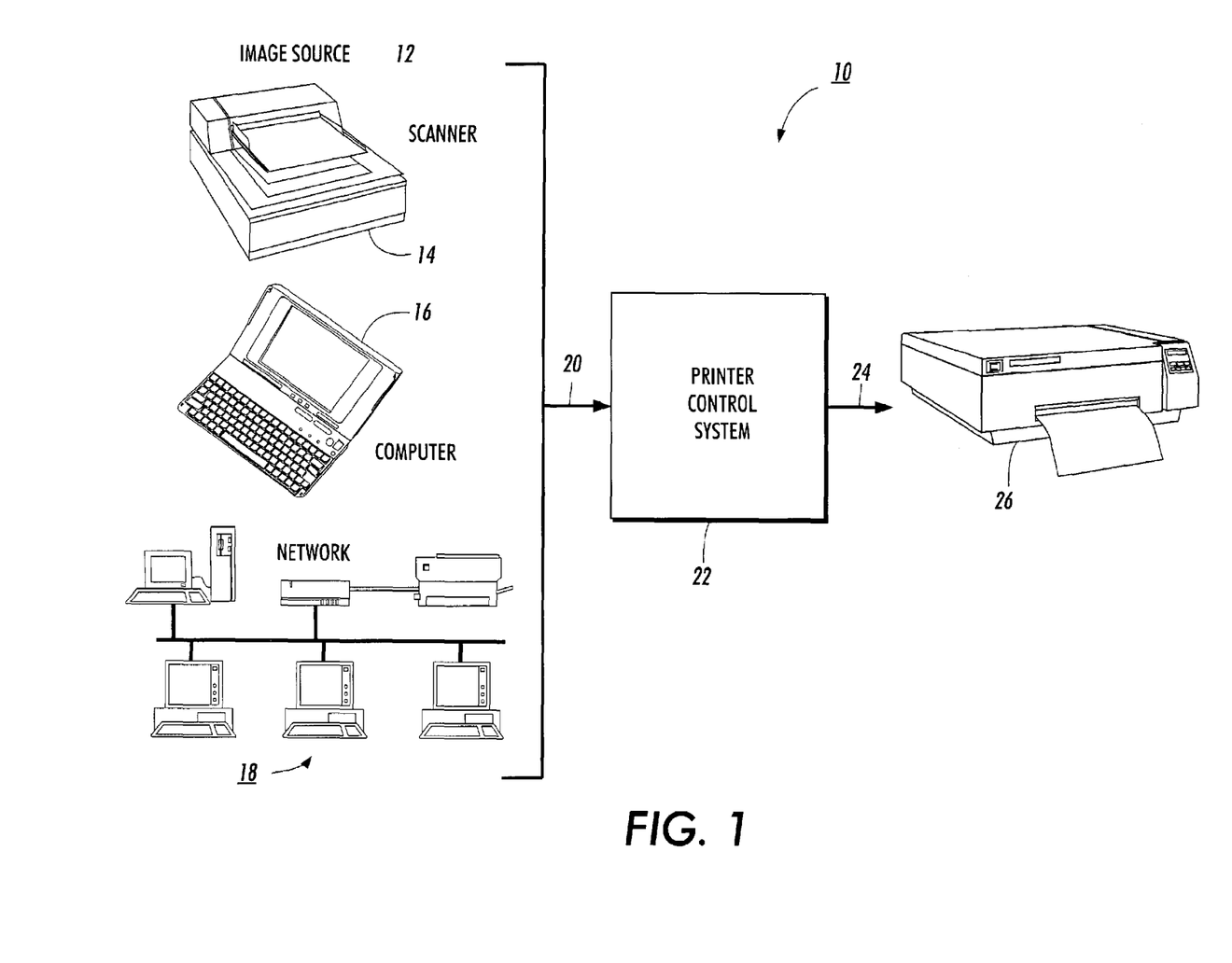
FIG. 1 is a general representation of a system-level embodiment which may incorporate one or more aspects of the embodiments disclosed herein.

Turning now to FIG. 1, there is shown an embodiment of an exemplary printing system 10 that incorporates the features disclosed herein. Printing system 10 includes image source 12 that may include scanner 14, computer 16, network 18 or any similar or equivalent image input terminal providing image data 20 which may be any combination of ASCII data, bitmapped image, pixel image data, geometric data, graphics primitives, page description language, etc. Image data 20 is supplied to printer control system 22 which processes the received image data 20 to produce print data 24 that drives printer 26.

In one embodiment, printer control system 22 may comprise what is commonly referred to in the art as a print driver. Printer control system 22 may also comprise a digital front end or similar controller driving printer 26. Those skilled in the art will recognize that control system 22 may be implemented in hardware and/or software and may reside within image source 12, within printer 26, within a separate component or in any combination thereof. In response to print data 24, which may comprise image data and/or printer control signals (e.g., paper handling, finishing options, carriage control, ink deposition), printer 26 generates an output image on a suitable medium (e.g., print or display).

It will become evident from the following discussion that printer 20 may comprise any one of a number of printing devices including, but not limited to, electrophotographic printers, liquid ink printers (e.g., drop-on-demand; phase change wax-based; piezoelectric, acoustic, or thermal ink-jet), ionographic printers, etc. Furthermore, the teaching are not limited in their application to copying and printing machines and may be incorporated in other output devices such as electronic display systems including CRTs, LCDs, LED, etc.

Aspects of the teachings and/or embodiments discussed herein are generally useful as features or characteristics of printer control system 16 depicted in FIG. 1; however, the teachings and embodiments disclosed herein are not limited in their application to such a system.

Figure 2:
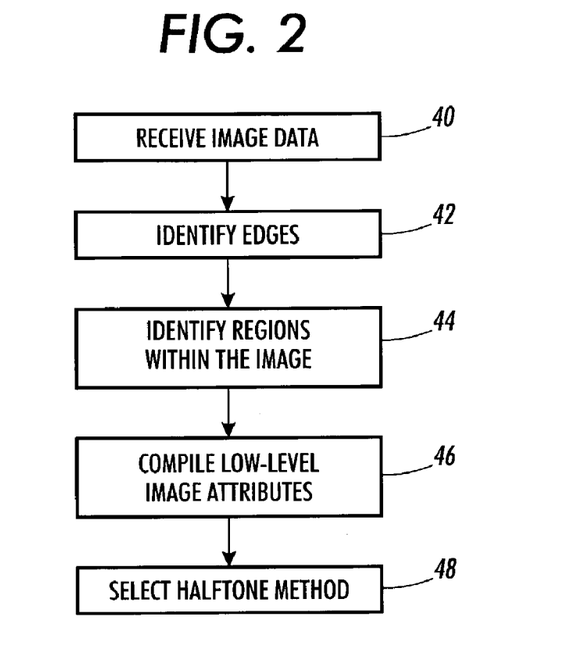
FIG. 2 illustrates an embodiment of a method for low-level segmentation-based halftone selection.

Turning now to FIG. 2, there is shown an embodiment of a method for selecting a halftoning mode to be applied to regions within an image. Briefly, the method begins with the receipt of image data (step 40) from which low-level regions within the received image data are identified. The low-level regions are defined and separated by edges. Pixels that are not separated by edges are considered to belong to the same region. The identification of low-level regions can be considered to comprise two sub-steps identifying edges in the image data (step 42) and identifying regions defined by the edges (step 44). After the regions have been identified, low-level image attributes for the image data within each region are compiled (step 46). A halftoning method suited for the image data within the region can be selected based upon low-level image attributes (step 48).

More specifically, image data comprising multiple scanlines of image data are received (step 40). Each scanline comprises a plurality of pixels with each pixel typically defining intensity information for a given location within the image defined by the image data. It should be appreciated that an image may comprise multiple image types including for example, graphics, text, text on tint, background, smooth contone, rough contone, low-frequency halftone, high-frequency halftone, intermediate frequency halftones which may be implemented as fuzzy frequencies, etc.

During an edge detection step (step 42), edges within the image data are identified. The edges can be identified by segmenting the received image data. The process may define edges as significant changes in intensity. That is, the process may determine whether the intensity of a pixel is significantly different than the intensity of the surrounding neighboring pixels and, if so, classify the pixel as an edge. Alternatively, the process may analyze pixels within the image data to determine an image type for each pixel. The process then may define edges as changes in image types or changes between one or more selected image types or image classes to another image class/type. Similarly, edges may be defined as changes between text and non-text areas.

In an embodiment wherein edge pixels are identified by detecting intensity changes in the image, the edge detection process compares the intensity a pixel to that of its neighboring pixels. If the pixel has a significantly different intensity than its neighboring pixels, the pixel is classified as an edge pixel. If the intensity of the pixel is not significantly different than the neighboring pixel, the pixel may be appended to (included within) the set of contiguous non-edge pixels within the scanline. That is, the image data is analyzed to identify edge pixels and line segments of "non-edge" pixels running between the edge pixels within each scanline.

During the identification of regions (step 44), the process identifies groups of pixels bounded by edges. In one embodiment, the line segments of non-edge pixels from adjacent scanlines are combined to generate the regions. As should be apparent, the identification of regions is analogous to a segmentation windowing operation. Having identified the regions bounded by edges, low-level image attributes for the image data within each region are compiled (step 46). Possible low-level image attributes for a region include, but are not limited to, the horizontal and/or vertical dimensions, the size (total pixel count), the brightness (color) distribution, the intensity range, and the smoothness (overall noise energy) of the region.

The statistics and/or data from which the low-level image attributes are determined can be collected using a second pass over the image data within the regions. Alternately, the process can gather the information for the low level image attributes as the image is segmented into the regions. That is, as the image data is analyzed to identify edges and line segments between the edges, the pixels forming such a line segment can be analyzed to gather information and statistics relating to the low-level image attributes. As line segments from a current scanline are combined with line segments form prior scanlines to form regions, the low-level statistics for such line segments are combined.

Figure 3:
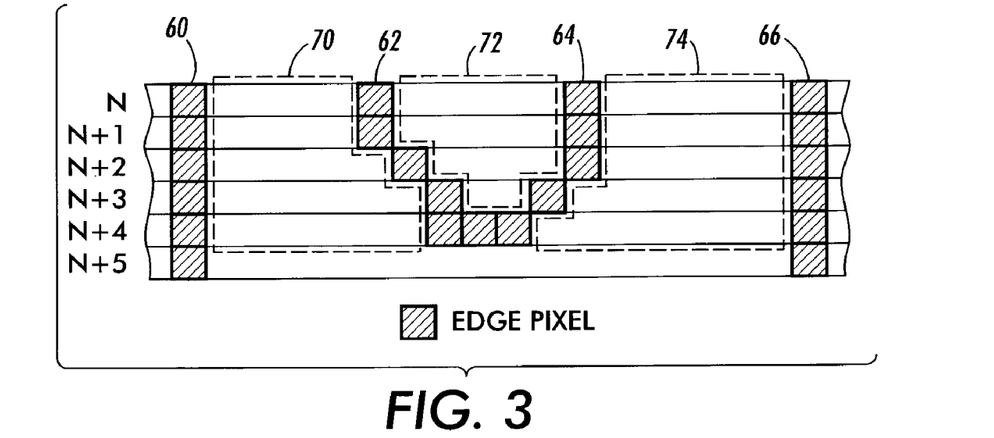
FIG. 3 shows a graphical representation of low-level segmentation for a portion of several scanlines of image data.

One embodiment of the processing of steps 42, 44 and 46 can be illustrated with additional reference to FIG. 3 where there is shown a graphical representation of low-level segmentation for a portion of several scanlines of image data. Operating on the image data in scanline N, edge detection step 42 may compare the intensity a pixel to that of its neighboring pixels to identify edges at pixels 60, 62, 64 and 68 and three line segments: a first segment between pixels 60 and 62, a second segment running between pixels 62 and 64 and a third segment between pixels 64 and 66. Having identified the three line segments in scanline N, the process can begin to collect statistics/information concerning the low-level image attributes for the segments.

The pixels within scanline N+1 can be analyzed in a similar manner to identify the four edge pixels and three line segments shown and to gather statistics concerning the low-level image attributes for the three segments therein. The processing to identify of regions (step 44) compares the line segments of scanline N+1 with those on scanline N to connect neighboring line segments into a region. For the image data of FIG. 3, in processing scanline N+1, three regions will be identified: a first region corresponding to the two line segments from running between pixels 60 and 62, a second region for the segments between pixels 62 and 64 and a third region for the segments between pixels 64 and 66.

As the identification of edge pixels and line segments and the collection of statistics occur on a scanline to scanline basis, the windowing operation (step 44) periodically connects line segments from successive scanlines to build regions. Through scanline N+3, the operation will connect each of the three line segments identified in a scanline to the respective line segments in adjacent scanlines form regions 70, 72, and 74. At scanline N+5 it can be determined that window segment 72 has ended thereby forming a completed region. After identifying the completed region, the low-level attributes for the region can be determined using the low-level statistics gathered. At scanline N+5, the operation can identify that regions 70 and 74 are connected and form a single region. Additionally, the low-level statistics for the two sub-regions can be merged to form a single region.

Returning to FIG. 2, having identified the low-level attributes for a region, a halftoning method for the image data within a region can be selected based upon the low-level image attributes. As should be appreciated, the embodiment of the halftone selection operation will vary based on the halftoning options available at the output device as well as the low-level attributes compiled. For example, consider an output device which offers error diffusion, stochastic screening and clustered dot screening as halftoning options. Both error diffusion and stochastic screening generate halftones with fairly decent overall quality. However, it is known that error diffusion may create worm artifacts at highlights and shadows and periodical patterns at certain gray levels. On the other hand, error diffusion is generally less noisy than stochastic screening, particularly when the input image itself is noisy. Clustered dot screening typically retains less details of the originals, but can be desirable for uniform inputs.

With error diffusion, stochastic screening and clustered dot screening as halftoning options, the method may compile the dimensions, size, intensity (brightness) range and the smoothness of the region as the low-level attributes. Given the above, one embodiment of the selection of a halftoning method based upon the low-level image attributes is illustrated in FIG. 4.

Figure 4:
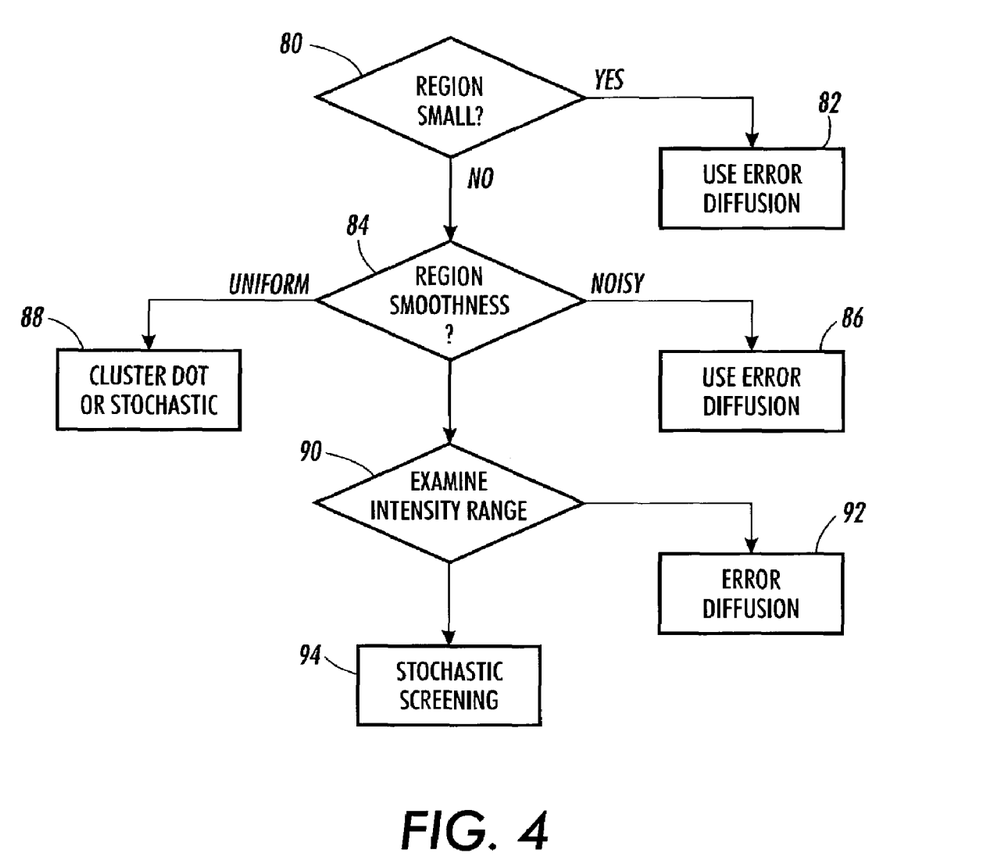
FIG. 4 illustrates an embodiment of the selection of a halftoning method using low-level attributes.

In FIG. 4, the selection of a halftoning method first reviews the low-level attributes to determine if the region is small (either the total pixel count is small or one of the horizontal and vertical dimensions is small) at step 80. If the region is small, the region is halftoned with error diffusion (step 82). If the region is not small, the smoothness of the region is checked by examining its overall noise energy (step 84). If the region is noisy, error diffusion is used (step 86) while clustered dot or stochastic screening is applied for uniform regions (step 88). For regions which are neither noisy or uniform, the intensity range is analyzed to determine if the range includes the highlights or shadows which may be subject to artifacts with error diffusion (step 90). Error diffusion or stochastic screening is then picked according to the analysis (steps 92 and 94). Those of skill in the art will appreciate that the determination of whether a region is considered to be "small," "noisy," "uniform," etc. will be dependent upon a number of factors including, for example, the halftoning options available, halftone characteristics for given images, halftone characteristics for a given output device, the resolution of the image data, etc.

Figure 5:
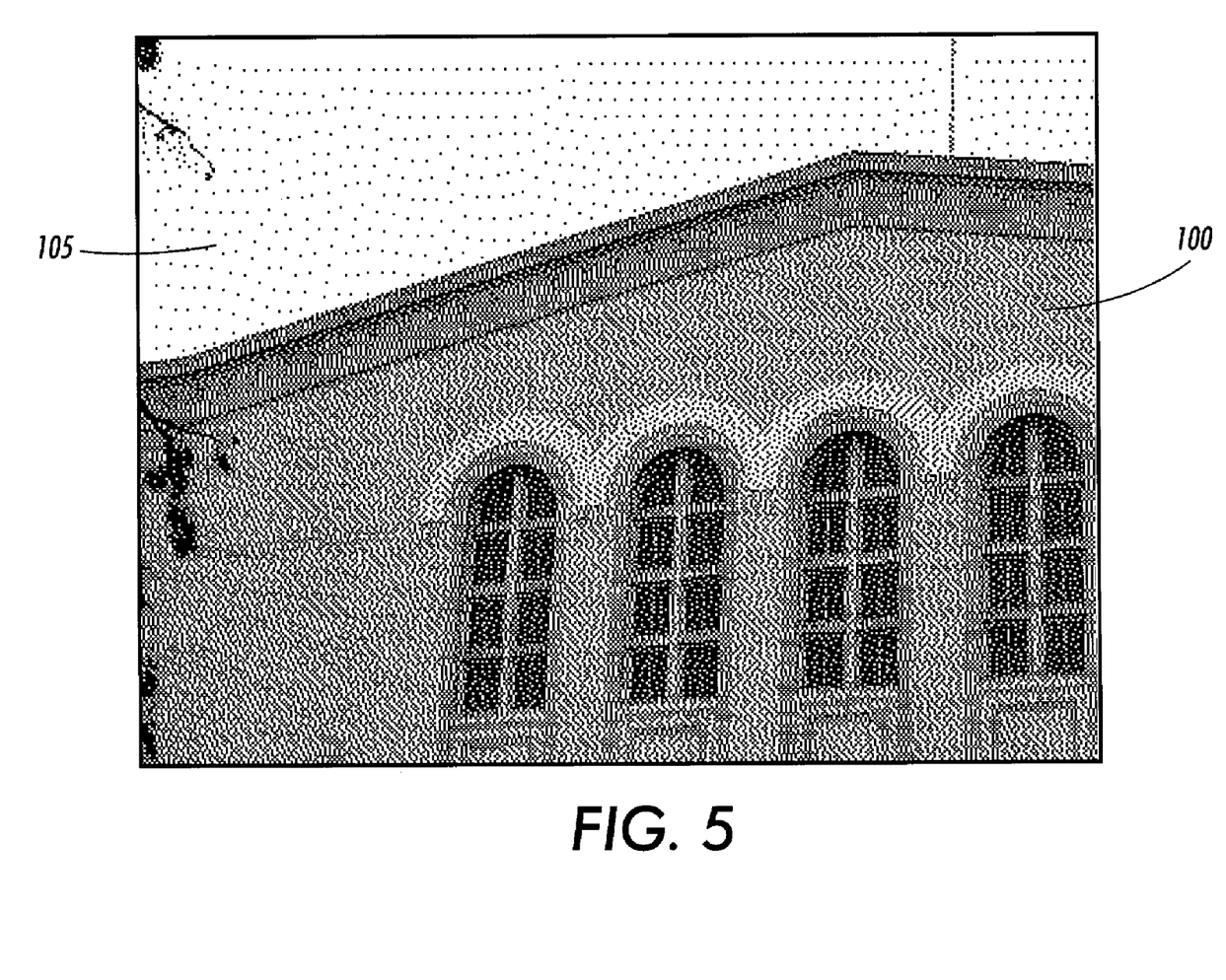
FIGS. 5 and 6 illustrate examples of a given image produced using error diffusion and stochastic screening, respectively.
Figure 6:
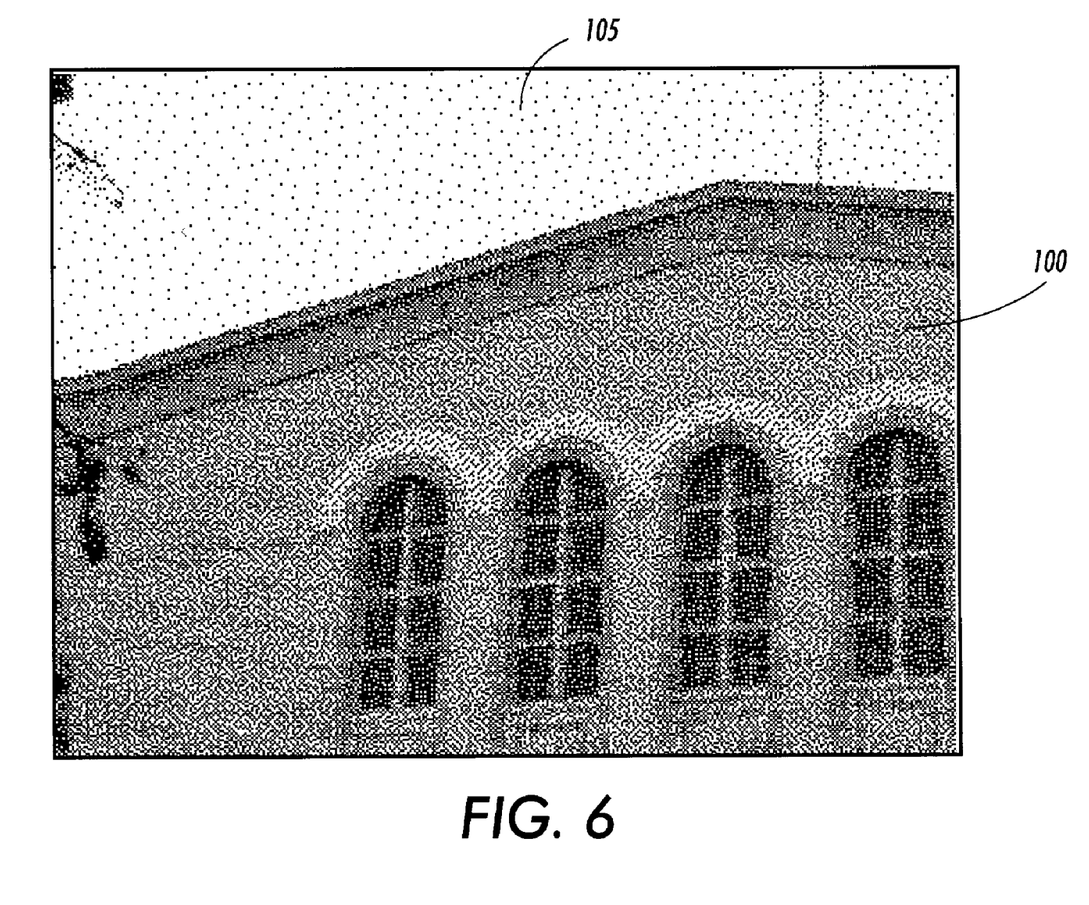
Figure 7:
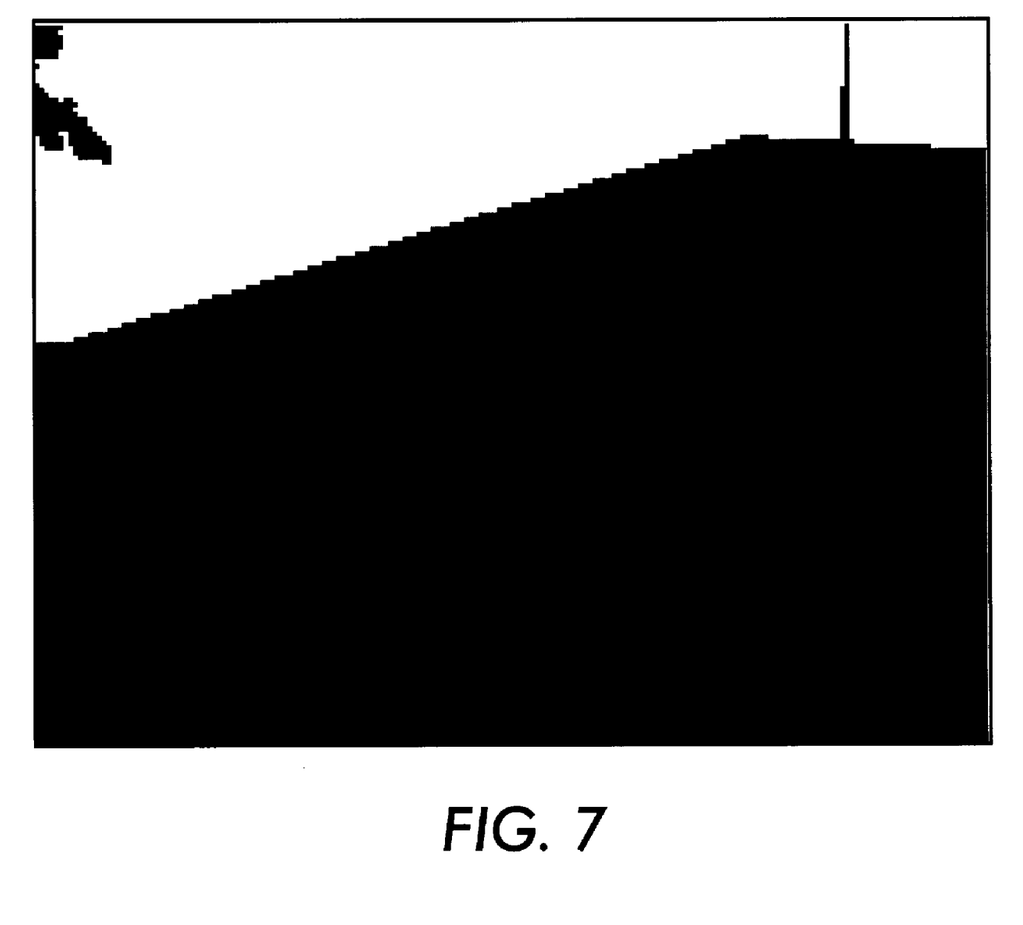
FIG. 7 illustrates a low-level segmentation map identifying different regions of the image of FIGS. 5 and 6.
Figure 8:
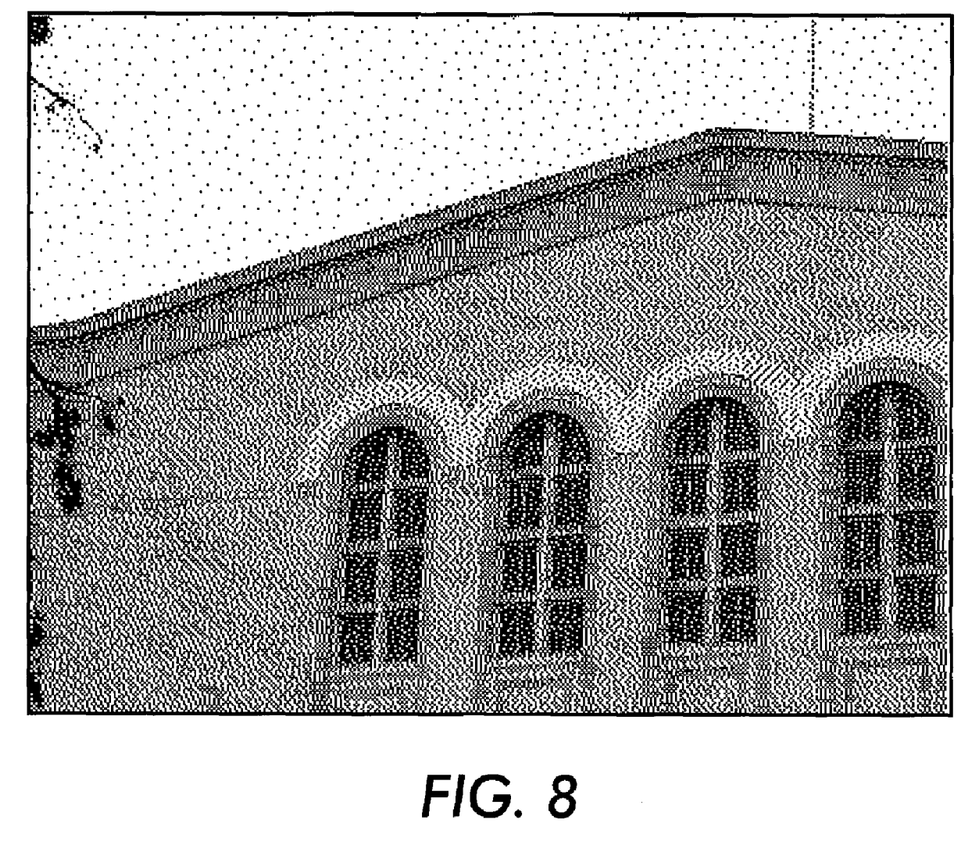
FIG. 8 illustrates an example of an image generated using a low-level segmentation based halftone selection method.

Turning now to FIGS. 5-8, there is illustrated an example of a process of halftone selection based on low-level image attributes. FIGS. 5 and 6 show examples of a given image produced using error diffusion and stochastic screening, respectively. As can be seen in FIG. 5, the error diffusion is less noisy and much sharper for the house part 100, but artifacts exist at the sky part 105. On the other hand, stochastic screening shown in FIG. 6 produces better halftones at the sky 105. Applying a low-level segmentation operation to the image produces the segmentation map of FIG. 7. In FIG. 7, the white region 110 indicates those pixels which should be rendered with stochastic screening and the black regions indicate those pixels which should be rendered with error diffusion. FIG. 8, show the resulting image when produced (halftoned) using the segmentation-based halftone selections as illustrated in FIG. 7. As can be seen in FIG. 8, the resulting image exceeds both stochastic screening and error diffusion in overall quality.

It should be appreciated that the embodiments described illustrate the use of low-level image attributes in the selection of a halftoning method and the low-level image attributes described as well as their application to the selection of a halftoning method and that other the low-level image attributes and halftoning methods as well as other combinations thereof may be used. That is one skilled in the art may readily apply the above teachings to different low-level image attributes in the selection of different halftoning methods. For example, by analyzing the halftones available for a given printer/output device, halftone characteristics for given images, halftone characteristics for a given output device, personal preferences, etc. one may develop alternate sets of low-level attributes and halftone selections.

Furthermore, it is to be appreciated that the low-level image attributes may be combined with high level attributes (e.g., text, text on tint, background, smooth contone, rough contone, low-frequency halftone, high-frequency halftone, intermediate frequency halftone) when selecting a halftoning method. For example, in addition to compiling low-level statistics, the process may analyze the pixels within the line segments running between the edges to compile high level attributes. Details on such analysis and compilation can be found in U.S. Pat. No. 5,850,474 to Fan et al., previously incorporated by reference.

Thus, what has been described is a method for selecting a halftoning mode to be applied to regions within an image. The method operates on received image data to identify low-level regions within the received image data. The low-level regions are defined and separated by edges. Pixels that are not separated by edges are considered to belong to the same region. After the regions have been identified, low-level image attributes for the image data within each region are compiled. A halftoning method suited for the image data within the region can be selected based upon low-level image attributes.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method for selecting a halftoning mode to be applied to an image, comprising:
   receiving image data;
   detecting edge pixels within the image data by,
      identifying a target pixel within a scan line of the image data,
      comparing an illumination intensity of the target pixel to the illumination intensity of neighboring pixels, and
      identifying the target pixel as an edge pixel when the illumination intensity of the target pixel is greater than the illumination intensity of the neighboring pixels;
   identifying an area bounded by the edge pixels;
   identifying the area bounded by the edge pixels as a region in the image data;
   determining low-level image attributes for the region; and
   selecting a halftone mode to be applied to the region based on the low-level image attributes of the region.

2. The method of claim 1, wherein low-level image attributes for the region are determined by compiling statistics for the region and using the compiled statistics to determine at least one low-level image attribute from a group of low-level image attributes comprising dimensions, size, color distribution, intensity range, and smoothness.

3. The method of claim 1, further comprising:
   analyzing pixels within the region to determine an image type for the pixels; and
   identifying a high level attribute for the region based on the image type;
   wherein the halftone mode applied to the region is selected based on the low-level image attributes and the high level attribute identified for the region.

4. A method for selecting a halftoning mode to be applied to an image, comprising:
   receiving image data;
   detecting edge pixels within the image data by,
      segmenting the received image data to analyze pixels within the received image data,
      determining an image type for the pixels, and
      defining edge pixels as a change in image types;
   identifying an area bounded by the edge pixels;
   identifying the area bounded by the edge pixels as a region in the image data;
   determining low-level image attributes for the region; and
   selecting a halftone mode to be applied to the region based on the low-level image attributes of the region.

5. The method of claim 4, wherein low-level image attributes for the region are determined by compiling statistics for the region and using the compiled statistics to determine at least one low-level image attribute from a group of low-level image attributes comprising dimensions, size, color distribution, intensity range, and smoothness.

6. The method of claim 4, further comprising:
   analyzing pixels within the region to determine an image type for the pixels; and
   identifying a high level attribute for the region based on the image type;
   wherein the halftone mode applied to the region is selected based on the low-level image attributes and the high level attribute identified for the region.

7. A method for selecting a halftoning for use within an image, comprising:
   receiving image data;
   identifying illumination intensity edge pixels within the received image data;
   identifying an image area bounded by illumination intensity edge pixels;
   identifying the image area bounded by illumination intensity edge pixels as a region within the image;
   determining low-level image attributes for the region; and
   selecting a halftone mode to be applied to the region based on the low-level image attributes determined for the region.

8. The method for selecting a halftoning according to claim 7, wherein determining the low-level image attributes for the region is based upon at least one low-level image attribute from a group of low-level image attributes comprising dimensions, size, color distribution, intensity range, and smoothness.

9. The method for selecting a halftoning according to claim 7, further comprising:
   analyzing a set of pixels within the region to identify an image type for each pixel within the set; and
   determining a high level attribute for the region based on the image types identified for the pixel within the set; and
   wherein selecting a halftone mode to be applied to the region is based upon low-level image attributes and the high level attribute determined for the region.

* * * * *